(12) United States Patent
Tolbert

(10) Patent No.: US 11,357,678 B1
(45) Date of Patent: Jun. 14, 2022

(54) WHEEL BRUSH FOR A WHEELCHAIR

(71) Applicant: Billy Tolbert, Evergreen, AL (US)

(72) Inventor: Billy Tolbert, Evergreen, AL (US)

(*) Notice: Subject to any disclaimer, the term of this patent is extended or adjusted under 35 U.S.C. 154(b) by 83 days.

(21) Appl. No.: 16/792,411

(22) Filed: Feb. 17, 2020

(51) Int. Cl.
| | |
|---|---|
| *A61G 5/10* | (2006.01) |
| *B08B 1/00* | (2006.01) |
| *A46B 15/00* | (2006.01) |
| *B60S 1/68* | (2006.01) |

(52) U.S. Cl.
CPC ............ *A61G 5/10* (2013.01); *A46B 15/0055* (2013.01); *A46B 15/0097* (2013.01); *B08B 1/002* (2013.01); *B60S 1/68* (2013.01); *A46B 2200/3073* (2013.01)

(58) Field of Classification Search
CPC . B60S 1/68; B60S 1/685; B60S 3/042; A61G 5/10; A46B 15/00; A46B 2200/30; A46B 2200/3046; A46B 2200/3073; A46B 15/0055; A46B 15/0097; B08B 1/002; B08B 1/02
USPC ............ 15/176.1, 176.6, 202, 256.5, 256.51; 280/855, 158.1, 856
See application file for complete search history.

(56) References Cited

U.S. PATENT DOCUMENTS

| | | | | |
|---|---|---|---|---|
| 1,407,214 | A * | 2/1922 | Osborn | A46B 7/04 15/176.6 |
| 1,571,999 | A * | 2/1926 | Davis | A46B 7/04 15/176.6 |
| 1,742,929 | A * | 1/1930 | Ovtshenikoff | A46B 15/00 15/160 |
| 3,231,293 | A * | 1/1966 | Loustaunau | A61G 5/10 280/211 |
| 5,295,278 | A * | 3/1994 | Condon | A46B 5/0012 15/104.04 |
| 9,067,570 | B2 * | 6/2015 | Kueppers | B60S 1/68 |
| 9,718,446 | B1 | 8/2017 | Tolbert | |
| 2014/0284911 | A1 * | 9/2014 | Kueppers | B60S 1/68 280/855 |

* cited by examiner

*Primary Examiner* — Andrew A Horton
(74) *Attorney, Agent, or Firm* — Peter Loffler

(57) ABSTRACT

A wheel brush for a wheelchair has a brush housing that has a longitudinal channel and an open bottom. A brush head is slidably received within the channel such that bristles located on the brush head extend out through the open bottom of the brush housing. The brush housing is attached to a back of a wheelchair via a connecting arm so as to position the bristles in engaging relationship with a portion of one of the rear wheels of the wheelchair. The connecting arm is either attached directly to the wheelchair or is attached to the wheelchair via a bracket, the bracket attached to the wheelchair and having a slot such that a leg of the connecting arm is received within the slot.

6 Claims, 6 Drawing Sheets

WHEEL BRUSH FOR A WHEELCHAIR

BACKGROUND OF THE INVENTION

1. Field of the Invention

The present invention relates to a brush that attaches to a vertical rearwardly located post of an armrest of a wheelchair wherein the brush acts upon and cleans a main wheel of the wheelchair.

2. Background of the Prior Art

Typical wheelchairs have a pair of rear or main wheels and a pair of front or caster wheels. In a manual wheelchair, the main wheels act as the drive wheels that are driven by the user of the wheelchair wherein the user grasps a push ring that is concentric with the rear wheel and places force on the push ring in order to turn the main wheel in response. Each main wheel is similarly configured—of course the wheelchair can also be locomoted by another person pushing or pulling the wheelchair via rearwardly situated push handles. The caster wheels, which tend to be substantially smaller than the main wheels, are swivelly attached to the frame of the wheelchair and assist in turning of the wheelchair with the actual steering being accomplished via uneven force or opposing forces being placed on the two push rings. This wheelchair architecture proves adequate and versatile for many wheelchair users.

One of the problems experienced by users of these types of wheelchairs is getting dirt on the outer periphery—the tread—of the main wheels, often from using the wheelchair outside but sometimes from indoor use as well. Such dirt poses certain problems including making for a bumpy ride, especially if the dirt gets caked onto the wheel, making the wheelchair slippery and difficult to maneuver which can be especially problematic in descent mode, and the problem of getting the floor on which the wheelchair rides dirty, which is especially problematic when using the wheelchair indoors.

Additionally, due to the proximity of the push ring to its main wheel, many users frequently come in contact with the main wheel during locomotion so that some of the dirt transfers to the user's hands and lower arm regions.

If a user resides in a facility such as an assisted living facility or nursing home, the user can ask staff to help clean the wheels when they get dirty. While effective, staff may not be readily available, especially if the user is traveling remote of the facility such as a trip to the mall. Some users can ask their home located significant other to correct the dirty wheel problem, which also suffers from the problem of significant other (or other caretaker) not being present when needed. Some users attempt to address the problem themselves by cleaning the wheel as needed. While often effective, this solution is time-consuming and often frustrating for the user and requires the user to be prepared with an appropriate implement for the job such as a cleaning rag which itself must be transported until appropriately discarded.

To address these problems, devices have been proposed which automatically clean the main wheels of a wheelchair whenever the wheelchair is in motion. Such devices, which come in a wide variety of architectures and work with varying degrees of efficiency, suffer from certain drawbacks. Many such devices are relatively complex in design and construction so that manufacture of such devices is expensive making the device cost-prohibitive. Some devices add a noticeable drag or rolling resistance to the wheelchair requiring the user, or his or her attendant if the wheelchair is being pushed, to work harder to overcome this resistance. Some devices require alterations be made to the wheelchair to install the device which alterations many users are not willing to make, especially if the wheelchair does not belong to the user.

What is needed is a wheelchair brush that cleans the main wheels of a wheelchair which overcomes the above-stated shortcomings found in the art. Specifically, such as device must be of relatively simple design and construction so as to be easy to install, use and maintain. Such a device must not significantly increase the rolling resistance of the wheel which the device services. Such a device must not require a permanent alteration be made to the wheelchair for proper usage of the device.

SUMMARY OF THE INVENTION

The wheel brush for a wheelchair of the present invention addresses the aforementioned needs in the art by providing a brush that is removably attached to a wheelchair and cleans a main wheel of the wheelchair whenever the wheelchair is in motion. The wheel brush for a wheelchair is of relatively simple design and construction, being produced using standard manufacturing techniques, so that the device is relatively inexpensive to produce so as to be economically attractive to potential consumers for this type of device. The wheel brush for a wheelchair adds negligible rolling resistance to the wheel that the device is servicing so that many users will not differentiate between the device's presence and absence from a workload requirement on the push ring point of view. The wheel brush for a wheelchair is removably attached to the wheelchair without the need for special tools or training and does not require any permanent alteration be made to the wheelchair.

The wheel brush for a wheelchair of the present invention is comprised of a brush housing that has a base plate and a pair of downwardly depending coextending side plates. Each side plate has an inwardly directed end plate such that a gap exists between the pair of end plates, the gap defining an open bottom of the brush housing. A brush head has a brush base and a series of bristles depending downwardly from the brush base such that the brush head is slidably disposed within the channel so as to sit on the end plates with the series of bristles extending outwardly from the open bottom. A connecting arm has a first end removably attached to the brush housing and a second end attached to the wheelchair so that the bristles engage a portion of an outer periphery of a respective one of the back wheels. The connecting arm has a first leg and a second leg such that the second leg slidably receives the brush housing. The connecting arm may also have a third leg such that the second leg is located between the first leg and the third leg and the third leg is attached to the wheelchair. A bracket is attached to the wheelchair such that the bracket has a vertical slot such that the third leg of the connecting arm is received within the slot. Alternately, a vertical slot is located on the first end of the connecting arm such that the brush housing has a vertical leg that is received within the slot.

BRIEF DESCRIPTION OF THE DRAWINGS

Similar reference numerals refer to similar parts throughout the several views of the drawings.

DESCRIPTION OF THE PREFERRED EMBODIMENT

Figure 1:
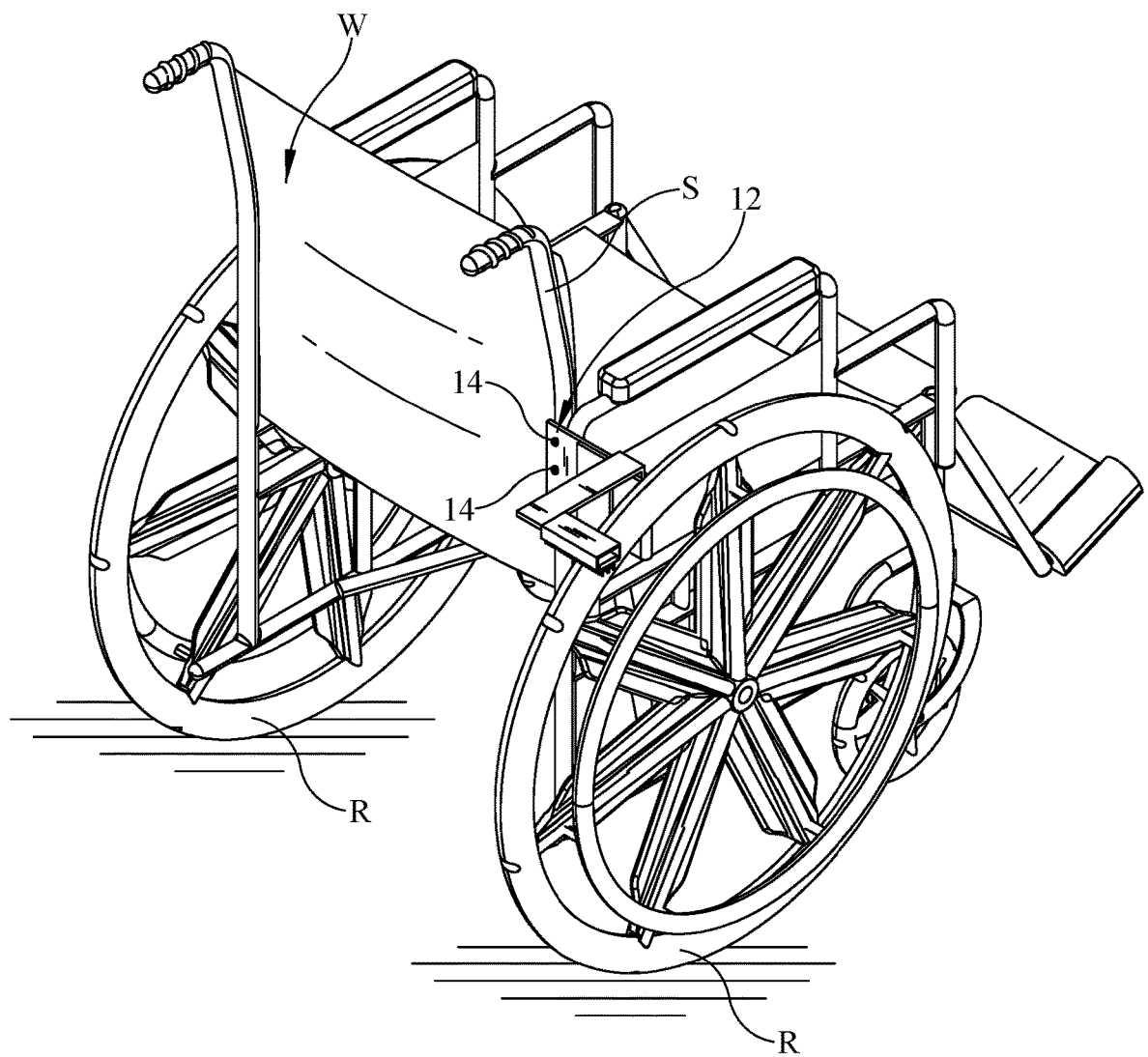
FIG. 1 is an environmental view of the wheel brush for a wheelchair of the present invention installed on a wheelchair.
Figure 2:
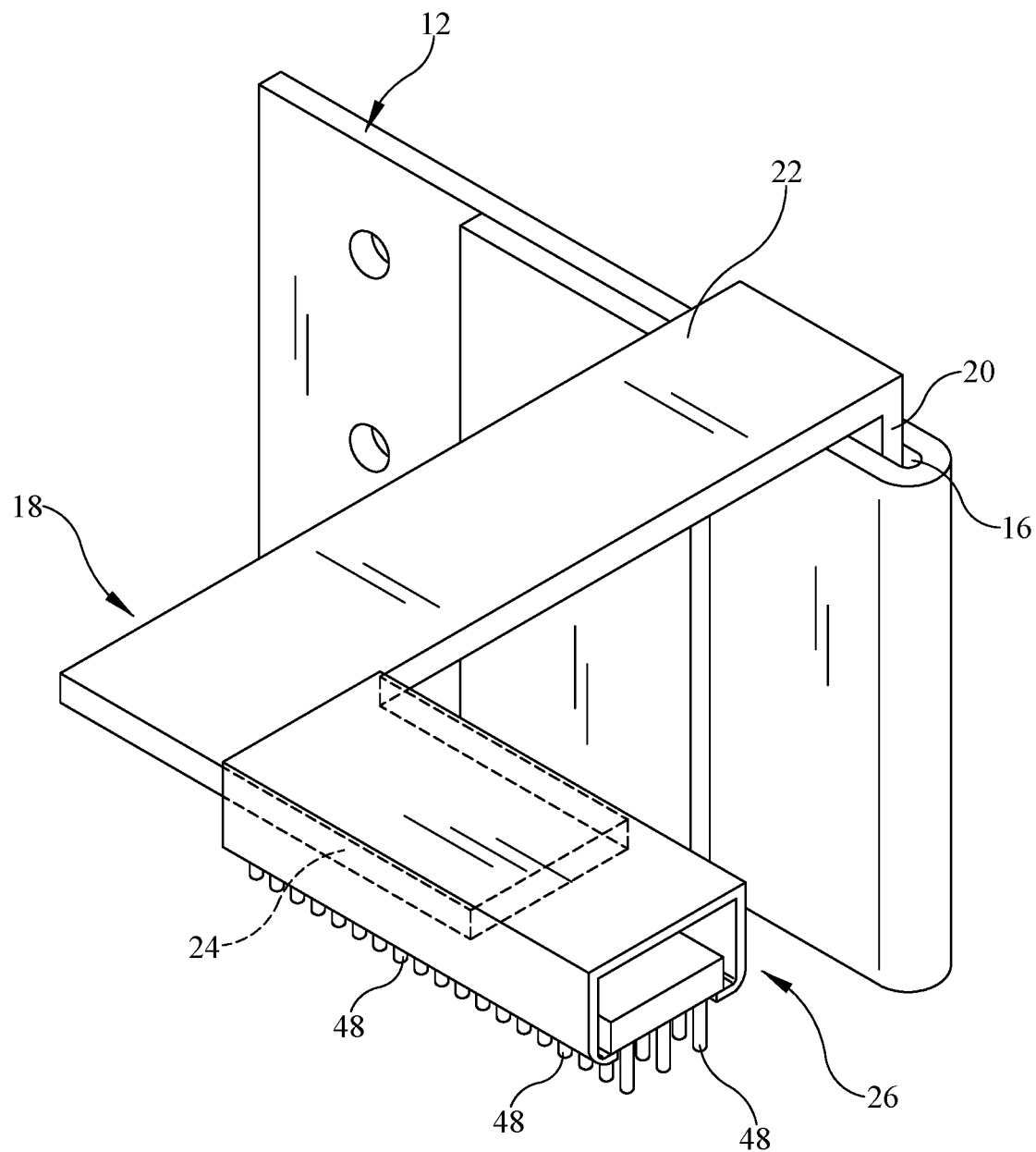
FIG. 2 is a perspective view of the wheel brush for a wheelchair.
Figure 3:
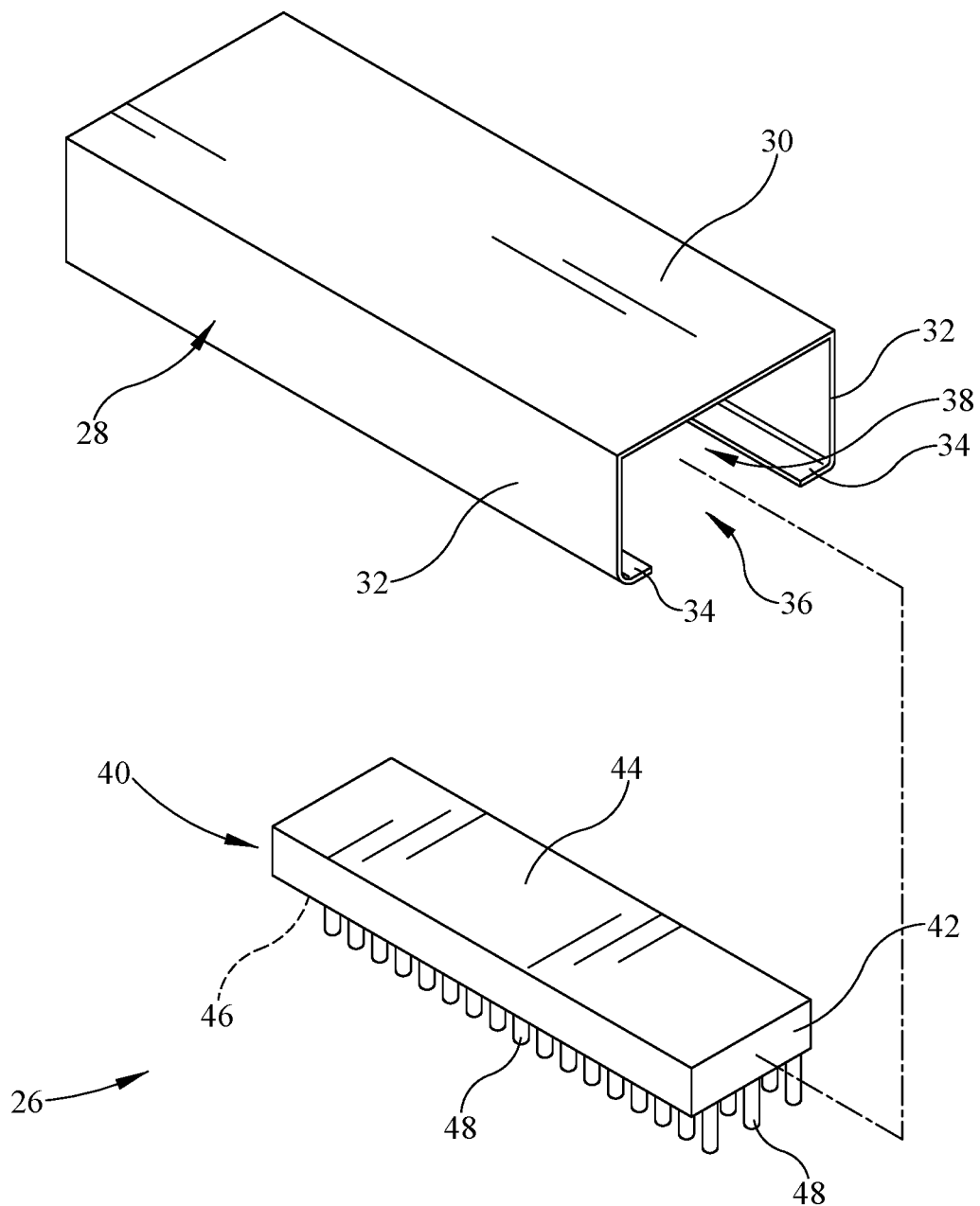
FIG. 3 is an exploded perspective view of the brush portion of the wheel brush for a wheelchair.
Figure 4:
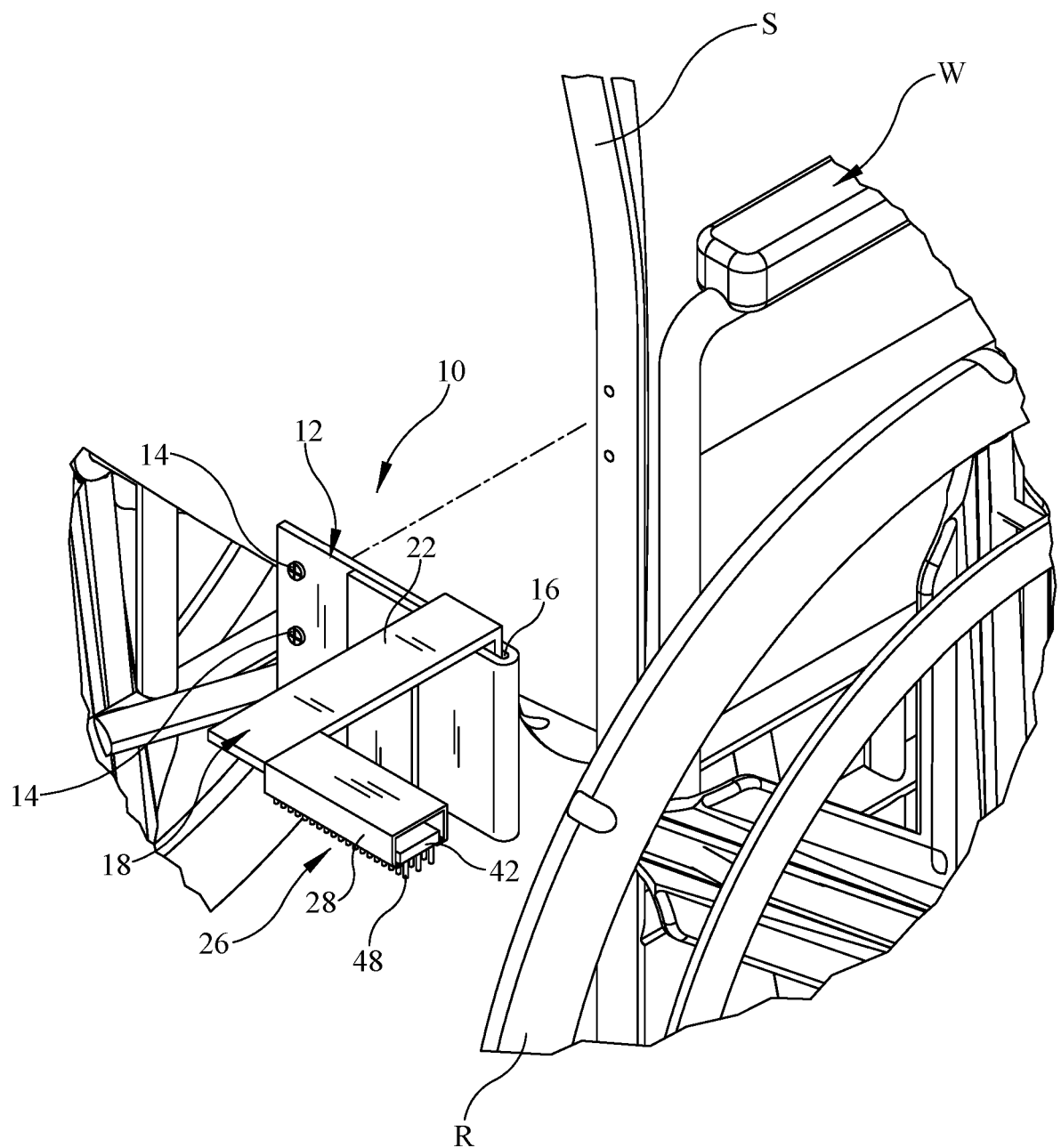
FIG. 4 is a close-up perspective view of the wheel brush for a wheelchair being installed onto the wheelchair.

Referring now to the drawings, it is seen that the wheel brush for a wheelchair of the present invention, generally denoted by reference numeral 10, is comprised of an attachment bracket 12 that is attached to a wheelchair W in appropriate fashion such as using the illustrated screws 14 to screw the attachment bracket 12 an appropriate to attachment point on the wheelchair such as to the rear vertical rail S. The vertical rail S may have preexisting screw holes therein for receiving the screws 14 or the wheelchair W can be modified to so receive the screws 14. The attachment bracket 12 can be attached via other appropriate means such as via the use of cooperating hook and loop material, a clip that clips the attachment bracket 12 to the wheelchair W, vertical rail encircling straps, welding the attachment bracket to an appropriate point on the wheelchair, etc. As seen, the attachment bracket 12 has a vertical slot 16 located on the side that is closer to the wheel R of the wheelchair which the wheel brush for a wheelchair 10 cleans.

A double-L-shaped connecting arm 18 has an upwardly directed vertical leg 20. A horizontal leg 22 extends outwardly from the vertical leg 20 (the plane of the vertical leg 20 is normal to the plane of the horizontal leg 22) while a side leg 24 extends sidewardly from horizontal leg 22 (the horizontal leg 22 and the side leg 24 are on the same plane and the longitudinal axis that passes through the horizontal leg 22 is generally normal to the longitudinal axis of the side leg 24).

A brush assembly 26 uses a brush housing 28 that has a base plate 30 with a pair of downwardly extending coextensive side plates 32 and a pair of inwardly directed bottom plates 34 so that a gap 36 exists between the bottom plates 34 and a channel 38 exists within the brush housing 28. A brush head 40 has a brush base 42 with an upper surface 44 and a lower surface 46 such that a series of bristles 48 extend downwardly from the lower surface 46 of the brush base 42. The brush base 42 has a length that is similar, more or less, to the length of the brush housing 28 and has a width that is greater than the width of the gap 36. The brush head 40 is received within the brush housing 28 by longitudinally sliding the brush head 40 into the channel 38 within the brush housing 28. As the width of the brush base 42 is less than the width of the channel, the brush head 40 is free to slide therein. Once the brush head 40 is in the desired position within the channel 38 of the brush housing 28, the brush head 40 sits on the inside surfaces of the inwardly directed bottom plates 34, being prevented from dropping out through the gap 36 due to the fact that the width of the gap 36 is less than the width of the brush base 42. As seen, the bristles 48 extend out from the gap 36.

In order to use the wheel brush for a wheelchair 10 of the present invention, a desired brush head 40 is selected and installed within the brush housing 28 as previously described. The side leg 24 is slid into the channel 38 of the brush housing 28 so that the side leg 24 of the connecting arm 18 is located between the upper surface 44 of the brush head 40 and the base plate 30 of the brush assembly 26. Thereafter, the vertical leg 20 of the connecting arm 18 is slid into the vertical slot 16 of attachment bracket 12. The connecting arm 18 is dimensioned so that bristles 48 of the brush head 40 are engaged with a portion of the rear wheel R of the wheelchair W. The brush assembly 26 may need to be slid slightly in one direction or the other along the side leg 24 for optimal position of the brush head 40 with respect to the rear wheel R.

As the wheelchair W is rolled about a ground surface, the rotating wheel R is brushed by the bristles 48 of the brush head 40, thereby removing dirt and debris from the wheel R as the wheel R rotates. A second wheel brush for a wheelchair 10 is installed in similar fashion on the opposite side of the wheelchair W in order to clean the other wheel R.

Whenever the brush head 40 needs changing, either to be cleaned or simply replaced due to being worn out or to use a different bristle configuration, the brush head 40 is slid out of the channel 38 of the brush housing 28 and a new brush head 40 is slid back thereinto (or the old brush head 40 is reinstalled after being cleaned).

Figure 5:
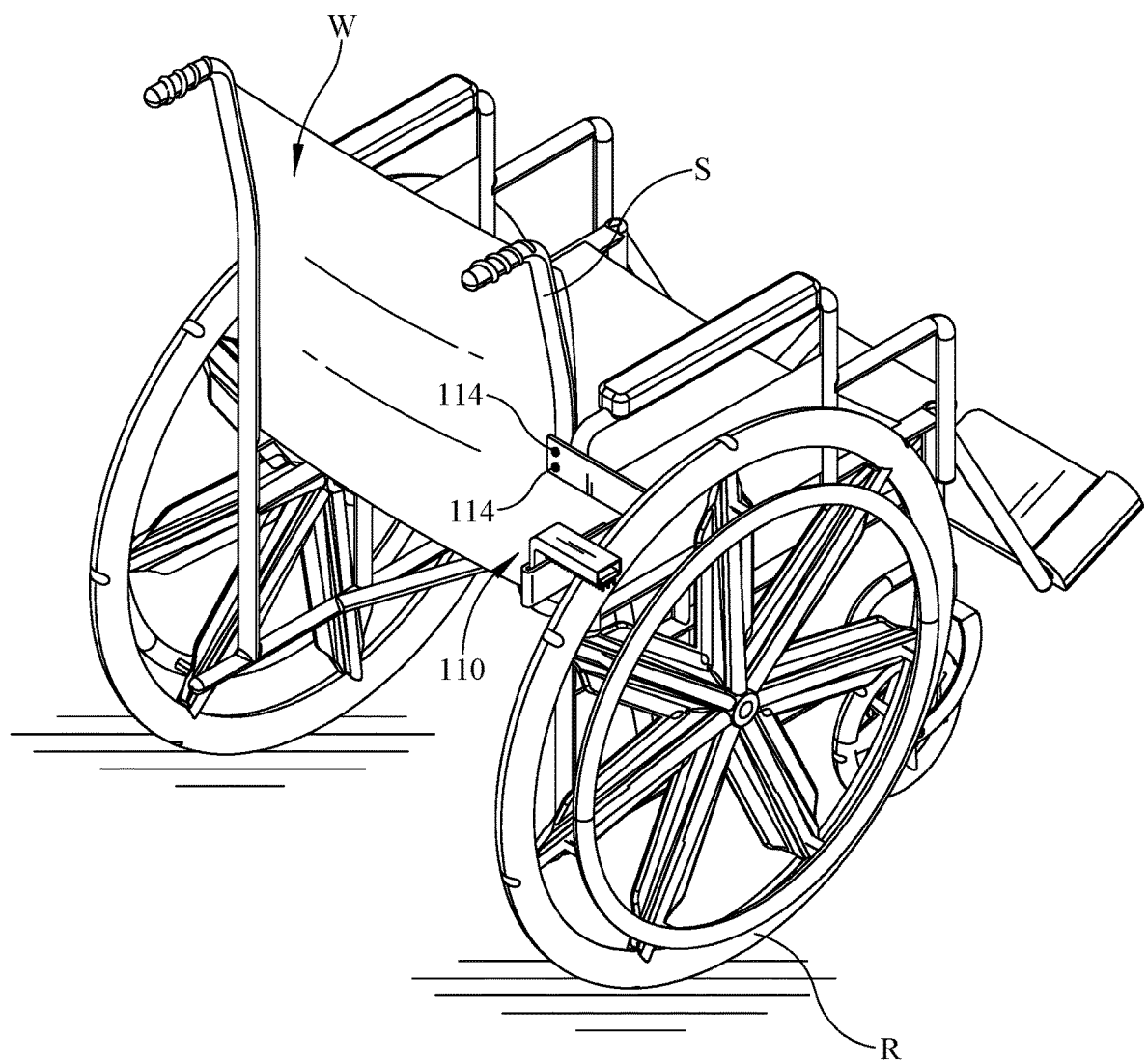
FIG. 5 is an environmental view of an alternate embodiment of the wheel brush for a wheelchair of the present invention installed on a wheelchair.
Figure 6:
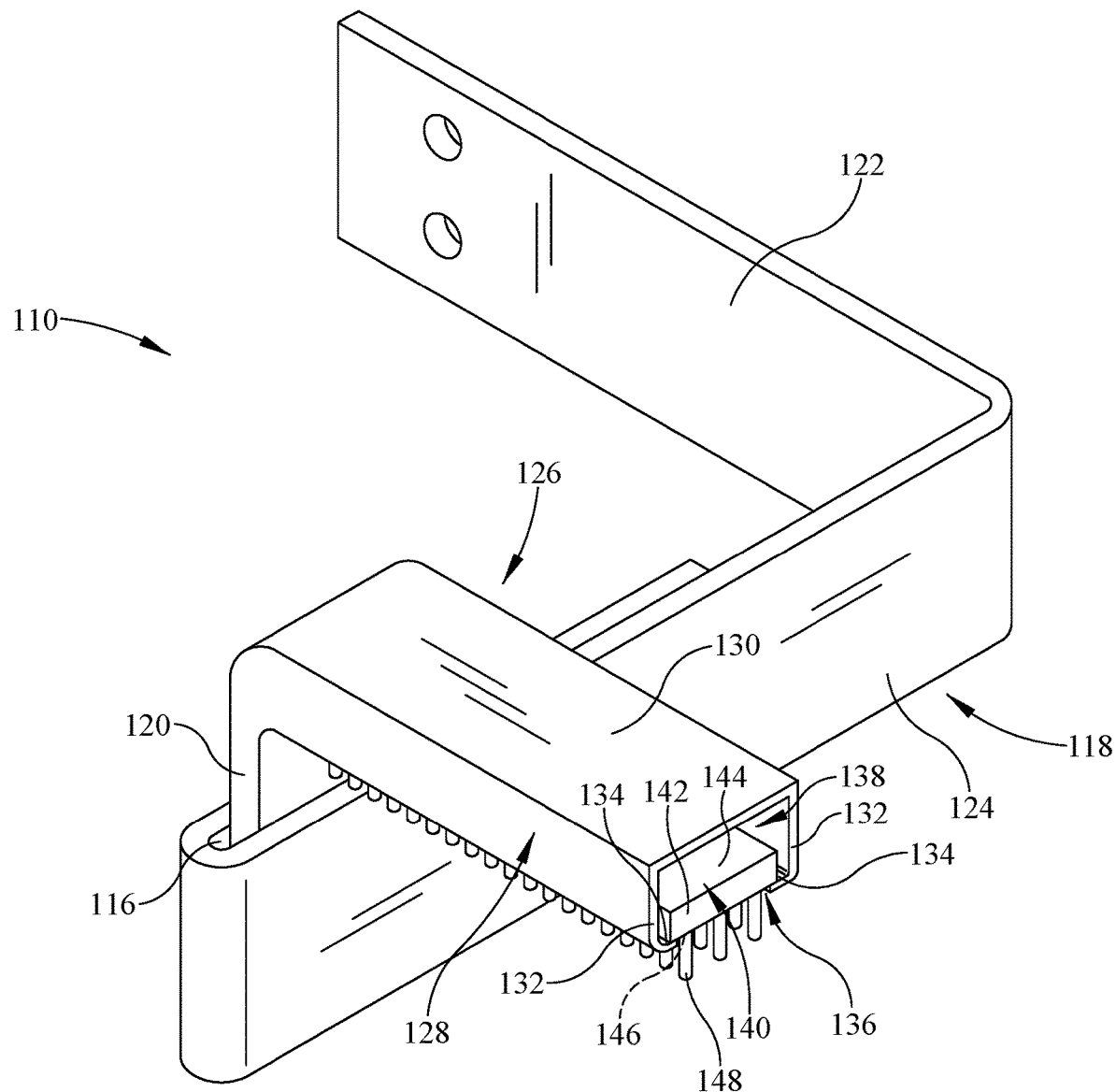
FIG. 6 is a perspective view of the wheel brush for a wheelchair of FIG. 5.

As seen in FIGS. 5 and 6, the position of the vertical slot can be altered in an alternate embodiment of the wheel brush for a wheelchair 110 which comprises an L-shaped connecting arm 118 that is directly attached to the wheelchair W in appropriate fashion such as using the illustrated screws 114 to screw the connecting arm 118 to an appropriate to attachment point on the wheelchair W such as to the rear vertical rail S. The vertical rail S may have preexisting screw holes therein for receiving the screws 114 or the wheelchair W can be modified to so receive the screws 114. The connecting arm 118 can be attached via other appropriate means such as via the use of cooperating hook and loop material, a clip that clips the connecting arm 118 to the wheelchair W, vertical rail encircling straps, welding the attachment bracket to an appropriate point on the wheelchair, etc. As seen, the connecting arm 118 has a first leg 122 and a second leg 124 that extends outwardly from the first leg 122 (the plane of the first leg 122 is normal to the plane of the second leg 124). A vertical slot 116 is located on a distal end of the second leg 124.

A brush assembly 126 uses a brush housing 128 that has a base plate 130 with a pair of downwardly extending coextensive side plates 132 and a pair of inwardly directed bottom plates 134 so that a gap 136 exists between the bottom plates 134 and a channel 138 exists within the brush housing 128. A downwardly directed vertical leg 120 extends downwardly from an end of the brush housing 128. A brush head 140 has a brush base 142 with an upper surface 144 and a lower surface 146 such that a series of bristles 148 extend downwardly from the lower surface 146 of the brush base 142. The brush base 142 has a length that is similar, more or less, to the length of the brush housing 128 and has a width that is greater than the width of the gap 136. The brush head 140 is received within the brush housing 128 by longitudinally sliding the brush head 140 into the channel 138 within the brush housing 128. As the width of the brush base 142 is less than the width of the channel 138, the brush head 140 is free to slide therein. Once the brush head 140 is in the desired position within the channel 138 of the brush housing 128, the brush head 140 sits on the inside surfaces of the inwardly directed bottom plates 134, being prevented from dropping out through the gap 136 due to the fact that the width of the gap 136 is less than the width of the brush base 140. As seen, the bristles 148 extend out from the gap 136.

In order to use the wheel brush for a wheelchair 110 of the present invention, a desired brush head 140 is selected and installed within the brush housing 128 as previously described. The vertical leg 120 of the brush housing 128 is slid into the vertical slot 116 of the connecting arm 118. The connecting arm 118 is dimensioned so that bristles 148 of the brush head 140 are engaged with a portion of the rear wheel R of the wheelchair W.

As the wheelchair W is rolled about a ground surface, the rotating wheel R is brushed by the bristles 148 of the brush head 140, thereby removing dirt and debris from the wheel R as the wheel R rotates. A second wheel brush for a wheelchair 110 is installed in similar fashion on the opposite side of the wheelchair W in order to clean the other wheel R.

Whenever the brush head 140 needs changing, either to be cleaned and replaced or simply replaced due to being worn out or to use a different bristle configuration, the brush head 140 is slid out of the channel 138 of the brush housing 128 and a new brush head 140 is slid back thereinto (or the old brush head 140 is reinstalled after being cleaned).

While the invention has been particularly shown and described with reference to an embodiment thereof, it will be appreciated by those skilled in the art that various changes in form and detail may be made without departing from the spirit and scope of the invention.

I claim:

1. A brush for a wheelchair, the wheelchair having a pair of back wheels, the brush comprising:

a brush housing having a base plate and a pair of downwardly depending coextending side plates, each side plate having an inwardly directed end plate such that a gap exists between the pair of end plates, the gap defining an open bottom;

a brush head having a brush base and a series of bristles depending downwardly from the brush base such that the brush head is slidably disposed within the channel so as to sit on the end plates and so that the series of bristles extend outwardly from the open bottom; and a connecting arm having a first end attached to the brush housing and a second end adapted to be attached to the wheelchair so that the bristles engage a portion of an outer periphery of a respective one of the back wheels, the connecting arm having a first leg and a second leg such that the second leg slidably receives the brush housing between the base plate and the brush head.

2. The brush as in claim 1 wherein the connecting arm also has a third leg such that the third leg is located between the first leg and the second leg.

3. The brush head as in claim 2 further comprising a bracket adapted to be attached to the wheelchair, the bracket having a vertical slot such that the second leg of the connecting arm is received within the slot.

4. The brush as in claim 1 in combination with the wheelchair.

5. The brush as in claim 4 wherein the connecting arm also has a third leg such that the third leg is located between the first leg and the second leg.

6. The brush head as in claim 5 further comprising a bracket adapted to be attached to the wheelchair, the bracket having a vertical slot such that the second leg of the connecting arm is received within the slot.

* * * * *